(12) United States Patent
Yoshida et al.

(10) Patent No.: US 6,417,909 B1
(45) Date of Patent: Jul. 9, 2002

(54) LIQUID CRYSTAL PANEL AND DISPLAY INCLUDING DICHROIC DYE FOR ABSORBING YELLOW COMPONENT OF INCIDENT LIGHT

(75) Inventors: Hidefumi Yoshida; Katsufumi Ohmuro, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/613,360

(22) Filed: Jul. 10, 2000

Related U.S. Application Data

(62) Division of application No. 08/926,839, filed on Sep. 10, 1997, now Pat. No. 6,147,740.

(30) Foreign Application Priority Data

Apr. 2, 1997 (JP) .............................................. 9-083177

(51) Int. Cl.[7] ...................... G02F 1/1347; G02F 1/1335; G02F 1/13
(52) U.S. Cl. ...................... 349/165; 349/178; 349/106; 349/79
(58) Field of Search ................................ 349/165, 178, 349/89, 78, 106, 122, 129, 79

(56) References Cited

U.S. PATENT DOCUMENTS

| | | | |
|---|---|---|---|
| 4,490,015 A | * 12/1984 | Kawarada et al. | 349/130 |
| 4,527,864 A | * 7/1985 | Dir | 349/96 |
| 4,593,977 A | 6/1986 | Takamatsu et al. | 350/339 |
| 4,886,343 A | 12/1989 | Johnson | 350/335 |
| 5,032,007 A | 7/1991 | Silverstein et al. | 350/335 |
| 5,136,406 A | * 8/1992 | Kato et al. | 359/53 |
| 5,317,431 A | 5/1994 | Yoshida et al. | 359/51 |
| 5,574,593 A | 11/1996 | Wakita et al. | 359/259 |
| 5,589,965 A | 12/1996 | Bahadur et al. | 349/165 |
| 5,621,558 A | 4/1997 | Shimada et al. | 349/130 |
| 5,801,796 A | 9/1998 | Lowe | 349/73 |

FOREIGN PATENT DOCUMENTS

JP             843825        2/1996

OTHER PUBLICATIONS

"Dichroic Liquid Crystal Displays"; Birendra Bahadur; *Liquid Crystals–Applications and Uses*; World Scientific, vol. III; Singapore, 1992.

* cited by examiner

*Primary Examiner*—William L. Sikes
*Assistant Examiner*—Tarifur R. Chowdhury
(74) *Attorney, Agent, or Firm*—Greer, Burns, & Crain, Ltd.

(57) ABSTRACT

A liquid crystal panel has a pair of substrates disposed almost parallel to each other. On each of the substrates, an electrode and an alignment film are formed. A liquid crystal layer having a negative dielectric anisotropy is sandwiched by the substrates. In the absence of voltage applied across the electrodes, the molecules of the liquid crystal layer align almost perpendicular to the substrates. In this liquid crystal layer, a dichroic dye, preferably a blue dichroic dye, is added to absorb the yellow component of an incident light. Instead of adding the dye into the liquid crystal layer, a color compensation layer containing the dye is formed on or adjacent to at least one of the substrates. The yellow component of an incident light to the liquid crystal panel is absorbed by the color compensation layer. As a result, the liquid crystal panel and the liquid crystal display using the panel do not show yellow coloring when the panel is observed from oblique directions.

8 Claims, 14 Drawing Sheets

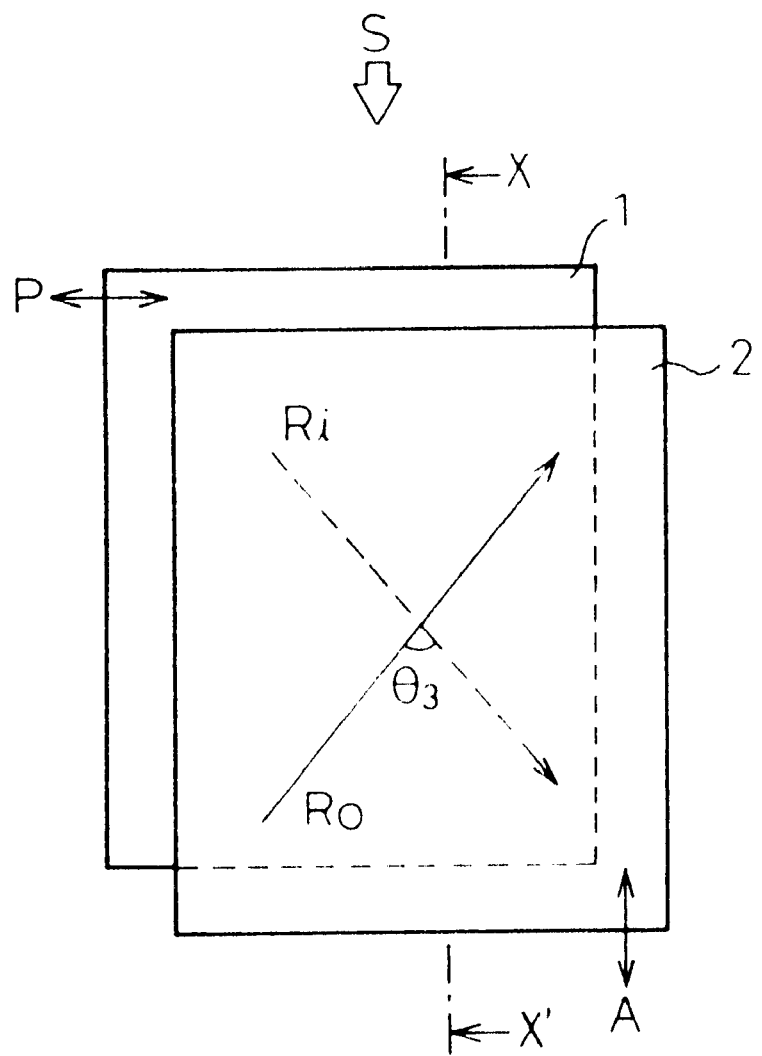

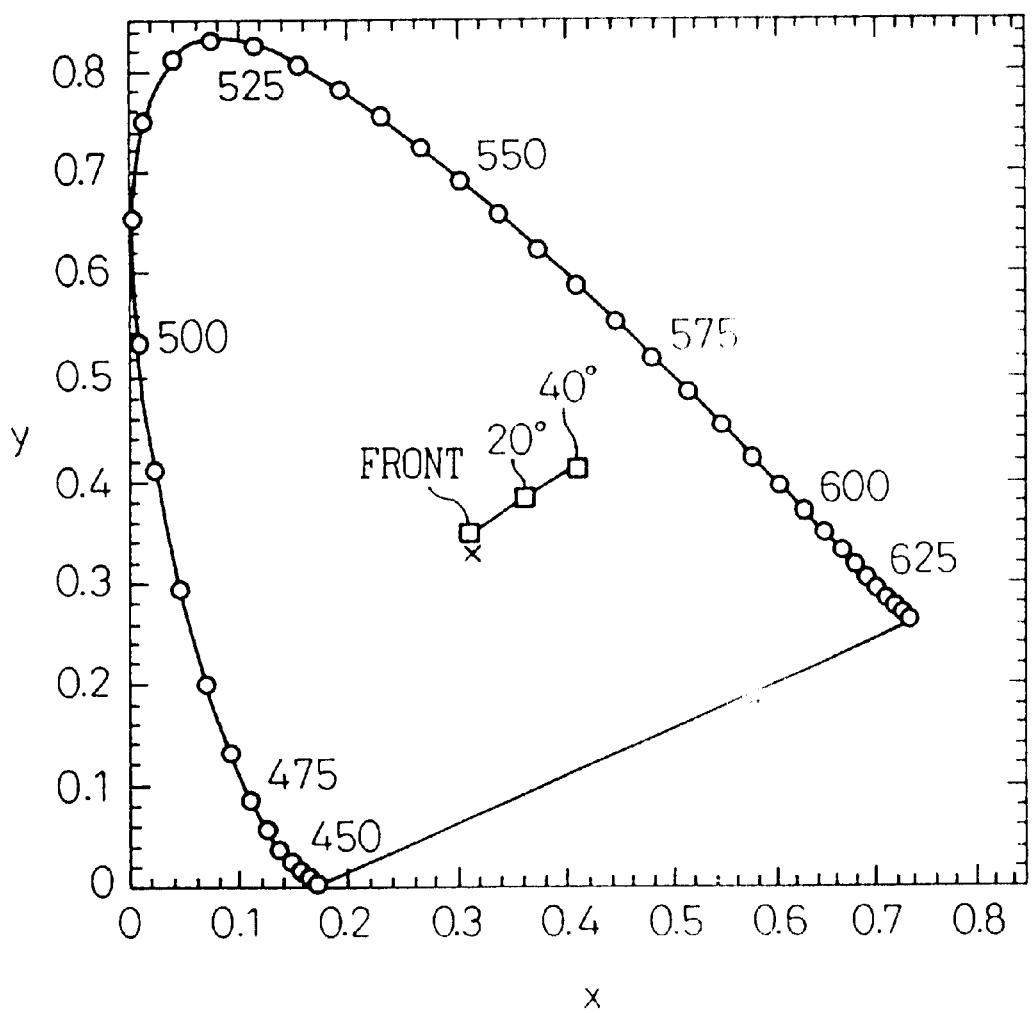

LIQUID CRYSTAL PANEL AND DISPLAY INCLUDING DICHROIC DYE FOR ABSORBING YELLOW COMPONENT OF INCIDENT LIGHT

This is a divisional of application Ser. No. 08/926,839, filed Sep. 10, 1997 now U.S. Pat. No. 6,147,740.

BACKGROUND OF THE INVENTION

1. Field of the Invention

The present invention relates to a liquid crystal panel and a liquid crystal display using the panel. In particular, it relates to a liquid crystal panel and a liquid crystal display which is driven in a mode which aligns liquid crystal molecules having a negative dielectric anisotropy almost perpendicular to the substrates of the panel in the absence of applied voltage (vertical aligned mode, referred to as VA mode below).

2. Description of the Related Art

Liquid crystal displays are used widely as a display for various information processing devices, such as computer and TVs.

In a conventional liquid crystal display, a liquid crystal panel of a TN type, an STN type or a TFT type etc. is widely used in a mode which aligns the liquid crystal molecules having a positive dielectric anisotropy, i.e., a p type liquid crystal, parallel to the substrates opposed to each other in the absence of applied voltage.

In a liquid crystal panel of a TN mode, for example, the alignment direction (the parallel direction) of the liquid crystal molecules adjacent to one substrate is usually twisted 90 degrees to that of the liquid crystal molecules adjacent to another substrate. When a pair of polarizing plates disposed outside of the panel are arranged so that their transmission axes intersect at right angles with each other (crossed nicol), a white display is realized in a non-driving state, while a black display is realized in a driving state. On the contrary, when the transmission axes of the polarizing plates are arranged parallel to each other (parallel nicol), a black display is realized in a non-driving state while a white display is realized in a driving state.

In such a TN mode crystal display panel, it is understood that the liquid crystal molecules are aligned parallel to the substrate surface of the panel in a non-driving state, and on the contrary, they are aligned almost perpendicular to the substrate surface of the panel in a driving state. In reality, however, the liquid crystal molecules adjacent to the substrate surface of the panel keep the parallel alignment even in a driving state. The liquid crystal molecules in such a parallel alignment cause a birefringence which transmits some amount of light through the panel in a driving state. Due to this fact, a high contrast cannot be realized in the conventional TN mode liquid crystal panel.

As shown in Unexamined Japanese Patent Publication No. 8-43825, VA mode liquid crystal panels are being developed for practical application. In a VA mode liquid crystal panel, a liquid crystal having a negative dielectric anisotropy is held between a pair of substrates forming the panel in a manner that the molecules of the liquid crystal are aligned almost perpendicular to the substrates.

Since the liquid crystal molecules in this VA mode panel are aligned almost perpendicular to the substrate surface in a non-driving state, incident light passes through the liquid crystal layer without its polarization plane changing very much. Thus, when the transmission axes of a pair of polarizing plates provided to sandwich the substrates are arranged perpendicular to each other (crossed nicol), an almost perfect black display can be realized in a non-driving state. Contrary to this, a white display can be realized in a driving state due to the rotation of the polarization plane of the incident light, since the liquid crystal molecules move to align parallel to the substrates while retaining the 90 degree twisted relation between the two substrates.

As a result, a very high contrast can be obtained in such a VA mode liquid crystal panel, a level of contrast which cannot be obtained by a TN mode liquid crystal panel.

However, the VA mode liquid crystal panel has a problem that it is colored yellow when observed from an upper oblique direction. To avoid this problem, it is possible to decrease the retardation of a liquid crystal panel. However, the display contrast of the panel deteriorates as the retardation of the panel decreases, thus reducing the brightness of the panel.

SUMMARY OF THE INVENTION

The present invention has been made to overcome the above-mentioned problems of the prior art. Therefore, an objective of the present invention is to provide a liquid crystal panel and a liquid crystal display using the panel which shows a high contrast and no coloring in a white display.

The first feature of the present invention provides a liquid crystal panel which is comprised of a pair of substrates, first and second electrodes formed on inner surfaces of the respective substrates, and first and second alignment films formed on the inner surfaces of the substrates to cover the first and the second electrodes respectively. In such a panel, a liquid crystal comprised of liquid crystal molecules having a negative dielectric anisotropy is provided between the two substrates to form a liquid crystal layer that contacts the first and the second alignment films. In the first feature, the liquid crystal layer contains a certain amount of dichroic dye, which is preferably a blue dichroic dye having a strong absorption band in yellow. The amount of this dye is 0.5 to 5 wt %, preferably, 1 to 3 wt % of the amount of liquid crystal layer. Preferably, the dichroic dye is made of an anthraquinone dye. In addition, the dye may have a strong absorption coefficient in the direction parallel to the major axis of the dye molecules.

According to the first feature mentioned above, the liquid crystal molecules in the panel are aligned almost perpendicular to the substrates in the absence of applied voltage because of their negative dielectric anisotropy. The molecules of the dichroic dye are aligned parallel to the liquid crystal molecules. Therefore, an excellent black display can be obtained in the absence of applied voltage when a pair of polarizing plates are disposed in crossed nicol.

On the other hand, when a voltage to conduct a white display is applied across the first and second electrodes, the liquid crystal molecules change their alignment direction so that a considerable angle, for example, about 45 degrees, is made against the substrate surfaces. At the same time, the molecules of the blue dichroic dye change their alignment direction to keep a parallel alignment with the liquid crystal molecules. Therefore, an excellent white display is obtained when observing the panel from a direction perpendicular to the panel. In addition, when observing the panel from an upper oblique direction, a yellow coloring due to the alignment direction of the liquid crystal molecules is suppressed because of the yellow absorption characteristics of the blue dichroic dye since the molecules of this dye are aligned parallel to the alignment direction of the liquid crystal molecules.

In a prior art of the present invention, the yellow coloring was suppressed by increasing the value of retardation of the liquid crystal. In this case, however, the display contrast was deteriorated when the retardation became large. Contrary to this prior art, the present invention need not increase the retardation to suppress the yellow coloring, and a high contrast in the display can be maintained.

In the second feature of the present invention, a color compensation layer containing the dichroic dye is formed on at least one of the substrates, instead of adding the dichroic dye into the liquid crystal layer.

According to the second feature, the yellow coloring is suppressed by the color compensation layer containing the dichroic dye based on the same reason as the first feature. Therefore, a liquid crystal panel having a high contrast and substantially no yellow coloring can again be obtained.

BRIEF DESCRIPTION OF THE DRAWINGS

The present invention will be more clearly understood from the description as set forth below with reference to the accompanying drawings, wherein:

FIG. 1 is a schematic view showing the structure of a prior art liquid crystal panel of a VA mode;

FIG. 3 is a graph showing the coloring characteristics of a prior art liquid crystal panel of a VA mode;

DESCRIPTION OF THE PREFERRED EMBODIMENTS

Before describing the embodiment of the present invention, the related art and the disadvantages therein will be described with reference to the related figures.

FIG. 1 shows the structure of a prior art VA mode liquid crystal panel. In FIG. 1, light enters from the back surface of the paper and the panel is observed from the front surface of the paper. In this figure, 1 and 2 denote a pair of substrates forming the liquid crystal panel and substrate 1 is on a light incident side and substrate 2 is on a light emitting side. An alignment film is coated on each of the inner surfaces of substrates 1 and 2, the inner surfaces being opposite to each other. Arrow Ri indicates an alignment direction of the alignment film formed on substrate 1 and arrow Ro indicates that of the film formed on substrate 2. Angle $\theta_3$ formed by the respective alignment directions of these films is 45 degrees. Arrow P indicates the direction of a transmission axis in a polarizing plate (not shown) disposed outside of substrate 1 on the light incident side, and arrow A indicates that of a polarizing plate (not shown) disposed outside of substrate 2 on the light emitting side. The transmission axes of these two polarizing plates intersect with each other at right angles. In addition, arrow S indicates a direction in which a yellow coloring is observed.

Figure 2A:
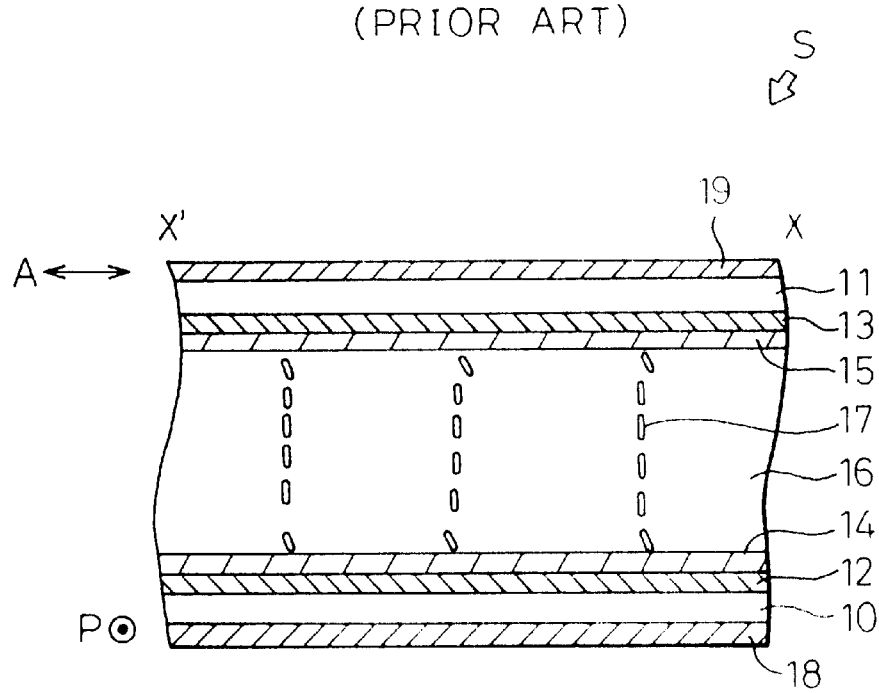
FIG. 2A is a cross sectional view along line X-X' shown in FIG. 1 in the absence of applied voltage.
Figure 2B:
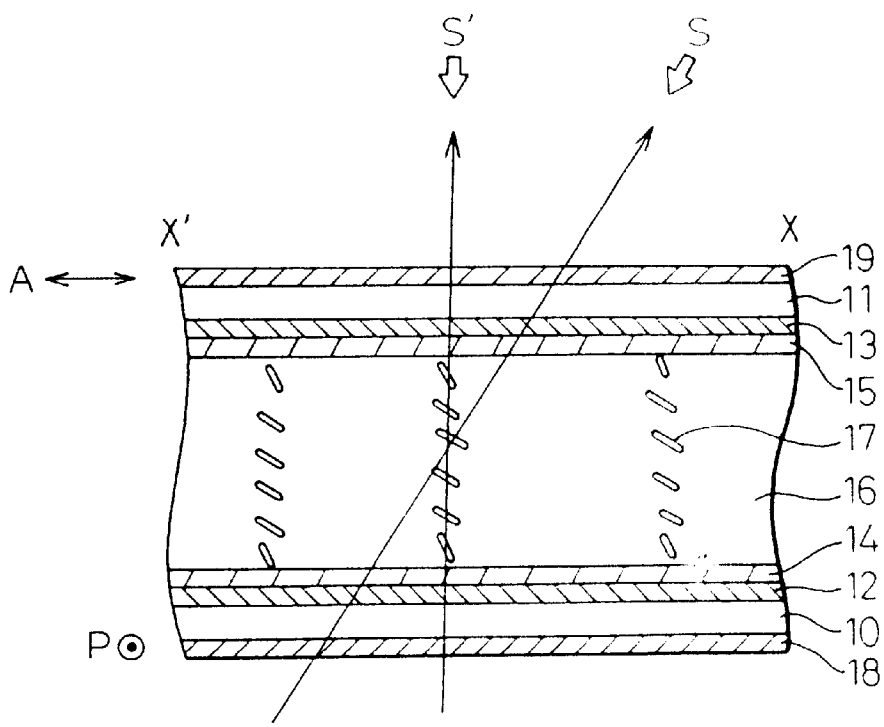
FIG. 2B is a cross sectional view along line X-X' shown in FIG. 1 in the presence of applied voltage.

FIGS. 2A and 2B show cross sections along line X-X' of the panel shown in FIG. 1, wherein FIG. 2A shows the panel in the absence of applied voltage (non-driving state) and FIG. 2B in the presence of an applied voltage (driving state).

Figure 10:
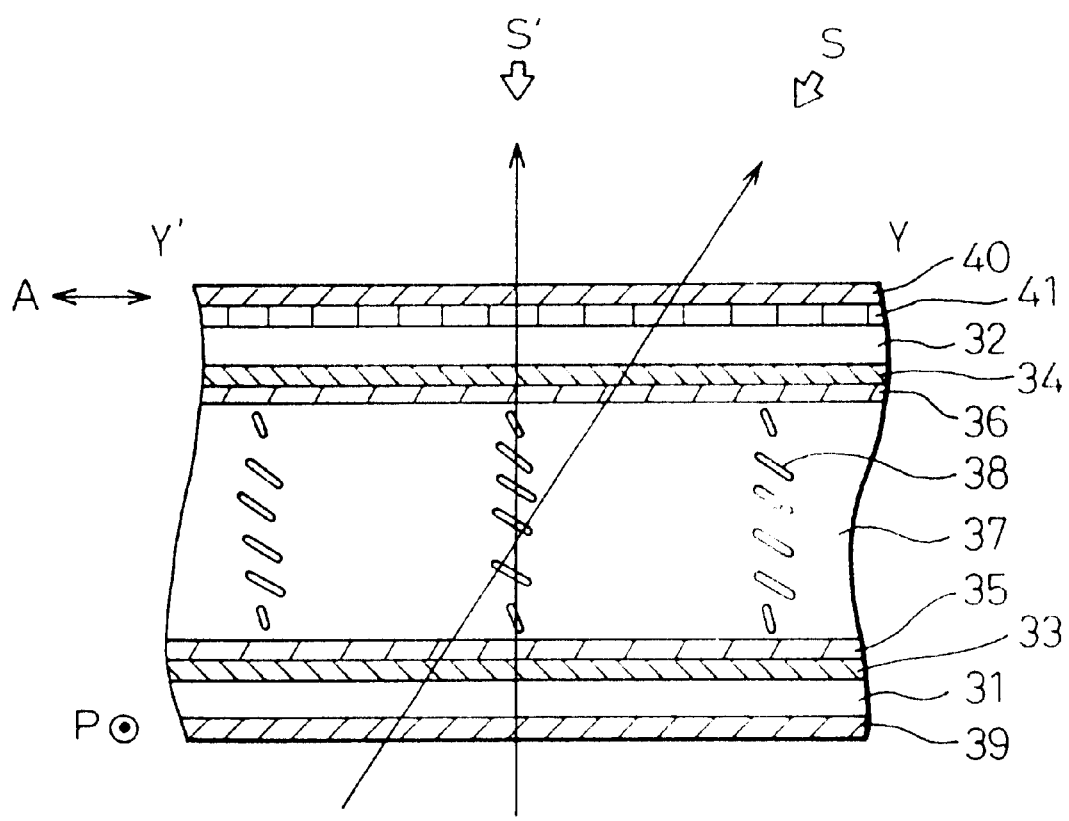
FIG. 10 is a cross sectional view of the panel shown in FIG. 5 along line Y-Y', the view explaining the second principle of the present invention.

In FIGS. 2, 10 denotes a first glass substrate forming a light incident side substrate, 11 a second glass substrate forming a light emitting side substrate, the first and the second glass substrates forming a pair of substrates. 12 denotes a first electrode formed on an inner surface of glass substrate 10, the inner surface being opposite to the second glass substrate 11, and 13 a second electrode formed on an inner surface of the second glass substrate 11, the inner surface facing the first glass substrate 10. The liquid crystal sandwiched by the first and second glass substrates 10 and 11 is driven by applying voltage to the electrodes 12 and 13 and forming an electric field therebetween. 14 denotes a first alignment film formed on substrate 10 to cover the first electrode 12, and 15 denotes a second alignment film formed on substrate 11 to cover second electrode 13. These two alignment films make the liquid crystal molecules align perpendicular to the glass substrates. 16 denotes a liquid crystal layer comprised of liquid crystal molecules 17 having a negative dielectric anisotropy. 18 denotes a first polarizing plate, formed outside a first glass substrate 10, whose direction P of transmission is perpendicular to the paper surface, and 19 a second polarizing plate, formed outside second glass substrate 11, whose direction A of transmission is parallel to the paper surface. Thus, the transmission directions of these two polarizing plates intersect to each other at right angles.

In a prior art VA mode liquid crystal panel shown in FIGS. 1 and 2, liquid crystal molecules 17 are aligned almost perpendicular to substrates 10 and 11 in the absence of voltage applied to first and second electrodes 12 and 13 as shown in FIG. 2A. An incident light (coming from the lower side of the figure) passing through the first polarizing plate 18 advances without its polarization plane changing, and therefore, it does not pass through the second polarizing plate 19 whose direction of the transmission axis is perpendicular to that of first polarizing plate 18. As a result, an excellent black display can be obtained. In this situation, the excellent black display can also be obtained when observing the panel from an upper oblique direction (the direction shown by arrow S).

When applying a voltage across first and second electrodes 12 and 13 to obtain a white display, liquid crystal molecules 17, which are aligned almost perpendicular to the panel in the absence of applied voltage, change their alignment direction according to the applied voltage, thus forming an angle of 45 degrees to substrates 10 and 11. In this case, a white display is obtained when observing the panel from a direction perpendicular to the panel (the direction shown by arrow S'), while it is colored yellow when observing the panel from an upper oblique direction (the direction shown by arrow S).

FIG. 3 shows coloring characteristics of a prior art VA mode liquid crystal panel. In this figure, observed color changes are plotted on a standard color system CIE (1931) while changing a visual angle from 90 degrees to 40 degrees. Symbol X in the figure indicates the standard white and numerals 450 and 625 indicate a wavelength (nm) of light. It can be seen from this figure that a blue light is observed around point 450, a green light is observed around point 525, and a red light is observed around point 625. It is also seen from this figure that an observed color point approaches towards a point 575 (nm) according to the change of the visual angle from 90 to 40 degrees. This means that the observed color changes towards yellow.

The reason of this is considered to be as follows.

Figure 4:
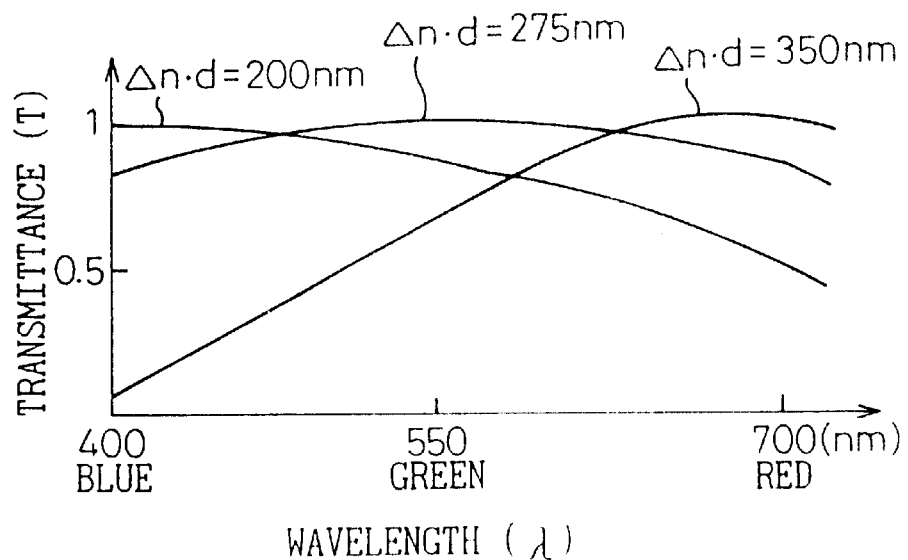
FIG. 4 is a graph showing the relation between the wavelength of an incident light and the transmittance thereof in various retardations of a liquid crystal.

FIG. 4 shows a relation between the wavelength of a light and the transmission thereof based on a various retardation $\Delta n \cdot d$ of a liquid crystal, where $\Delta n$ means a refractive index anisotropy and d means a thickness of the liquid crystal layer. In this figure, the axis of abscissa indicates a wavelength $\lambda$, and the longitudinal axis indicates a transmittance T of a light. This transmittance T is derived from the following equation:

$$T = \sin^2(\Delta n \cdot d \cdot \pi / \lambda).$$

The respective curves in FIG. 4 represent the relations where $\Delta n \cdot d$ is 200 nm, 275 nm and 350 nm respectively. As easily understood from FIG. 4, peaks of the respective curves move to the longer wavelength side of $\Delta n \cdot d$ increases.

Referring to FIG. 2A, it is seen that in the absence of applied voltage, liquid crystal molecules 17 are aligned almost parallel to the light passing through liquid crystal layer 16 perpendicularly. In other words, the parallel axis of the liquid crystal molecules are almost parallel to the light advancing direction. In this case, the effective value of $\Delta n \cdot d$ for a light advancing perpendicular to the panel surface becomes 220 nm, thus allowing an excellent black display.

As shown in FIG. 2B, in the presence of applied voltage across electrodes 12 and 13, liquid crystal molecules 17 have a tilt angle of 45 degrees to the light advancing through the liquid crystal layer 16 perpendicularly. The refractive index anisotropy $\Delta n$ of the liquid crystal varies according to the indicent angle of the light into the layer. In addition, an effective thickness d of the liquid crystal layer varies according to the incident angle of the light into this layer. Taking account of those points, the effective value of $\Delta n \cdot d$ along direction S' shown in FIG. 2B becomes 275 nm, and thus, an excellent white display is obtained, as shown in FIG. 4, and the incident light passes through the liquid crystal layer uniformly over the entire (visible) wavelength range.

When observing the panel from an upper oblique direction (as shown by arrow S in FIG. 2B), the major axis direction of liquid crystal molecules 17 forms an angle of about 90 degrees with the observing direction. In this case, $\Delta n$ has a larger value than when the angle is about 45 degrees. In addition, the effective thickness d becomes longer since the effective distance the light passes through the layer becomes longer, resulting in an effective value $\Delta n \cdot d$ of about 400 nm.

As can be seen from FIG. 4, the relationship curve of $\Delta n \cdot d = 400$ nm may be shifted towards a longer wavelength side than that of $\Delta n \cdot d = 350$ nm. This suggests that the light transmittance in the blue wavelength range is very low when $\Delta n \cdot d$ is about 400 nm. Accordingly, the display is colored yellow. In fact, the yellow coloring becomes remarkable when $\Delta n \cdot d$ exceeds 350 nm.

As explained above, the prior art VA mode liquid crystal panel has a problem that, when looking into the panel from an upper oblique direction, a yellow display occurs if light passing though a liquid crystal layer produces a large angle (for example, about 90 degrees) against the alignment direction of the liquid crystal molecules.

In addition, provided that the effective value of $\Delta n \cdot d$ along the direction perpendicular to the panel becomes more than 200 nm in the absence of applied voltage, the yellow display may be observed when a voltage is applied even though the panel is observed in the presence of an applied voltage even when observing the panel from a perpendicular direction.

To avoid the above mentioned problem, it is possible to set the value $\Delta n \cdot d$ small when forming the panel. However, if the value $\Delta n \cdot d$ is small, the display becomes dark even though the panel is observed from a perpendicular direction, thus reducing the brightness of the panel. Accordingly, high contrast, which is considered as an important advantage of the VA mode liquid crystal panel, is lost.

In summary, when the value $\Delta n \cdot d$ is selected large enough to obtain a high contrast, the panel will be seen as yellow depending on the visual angle. Contrary to this, the contrast of the display becomes low when $\Delta n \cdot d$ is set to a small value to avoid the coloring of the display which depends on the visual angle.

The principle of the present invention will be explained next with reference to FIG. 5 which shows the structure of a VA mode liquid crystal panel according to the present invention.

Figure 5:
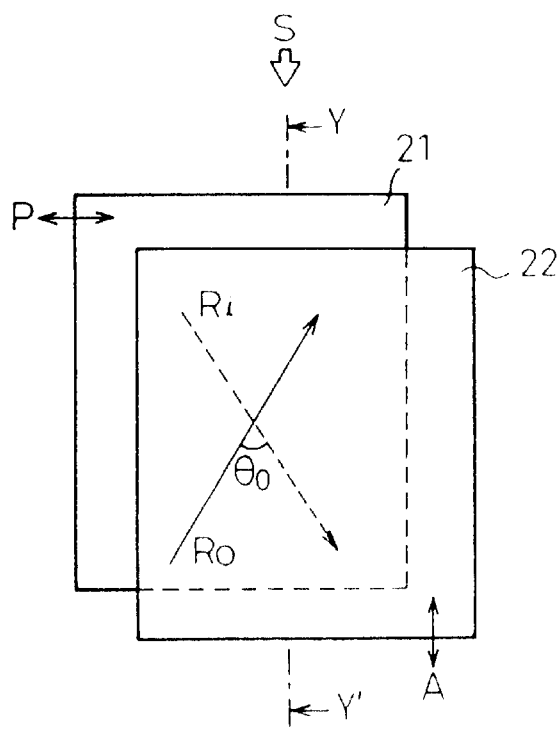
FIG. 5 is a schematic view showing the structure of a VA mode liquid crystal panel according to the present invention.

In FIG. 5, it is assumed that light enters the panel from the back surface of the paper and the panel is observed from the front surface of the paper. In this figure, 21 and 22 denote a pair of substrates forming the liquid crystal panel and substrate 21 is placed on the light incident side whilst substrate 22 is on the light emitting side. An alignment film is coated on each of inner surfaces of substrates 21 and 22, the inner surfaces facing each other. Arrow Ri indicates the alignment direction of the alignment film formed on substrate 21 and arrow Ro indicates that of the film formed on substrate 22. Angle $\theta_0$ formed by the alignment directions of these films is 45 degrees. Arrow P indicates the direction of the transmission axis of a polarizing plate (not shown) disposed outside substrate 21 on the light indicent side, and arrow A indicates that of another polarizing plate (not shown) disposed outside substrate 22 on the light emitting side. The transmission axes of these two polarizing plates intersect with each other at right angles. In addition, arrow S indicates a direction in which a yellow coloring appears, that is, a visual angle in an upper oblique direction.

Figure 6A:
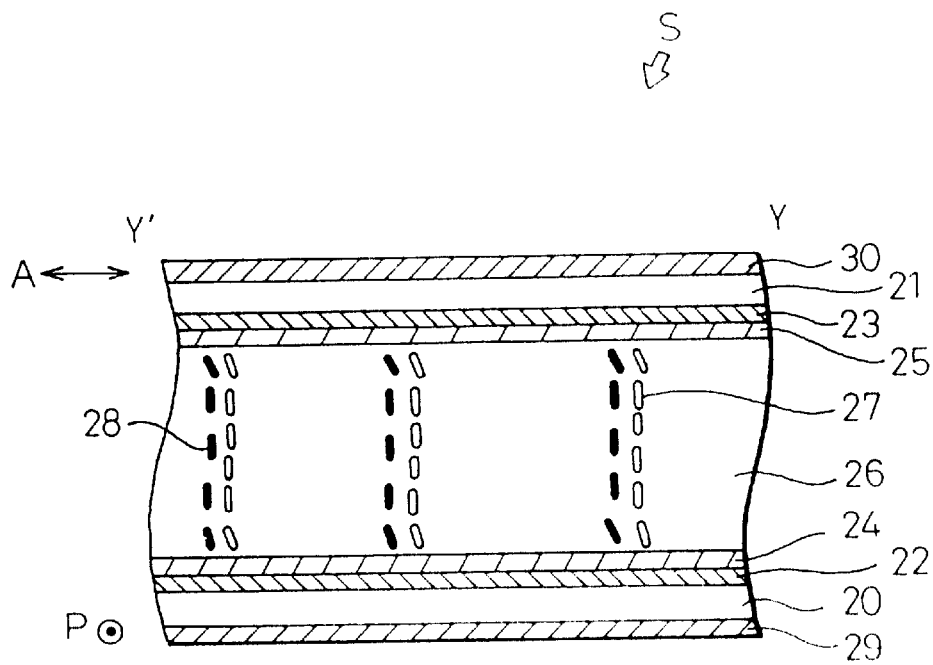
FIG. 6A is a cross sectional view along line Y-Y' shown in FIG. 5 in the absence of applied voltage, the view explaining the first principle of the present invention.
Figure 6B:
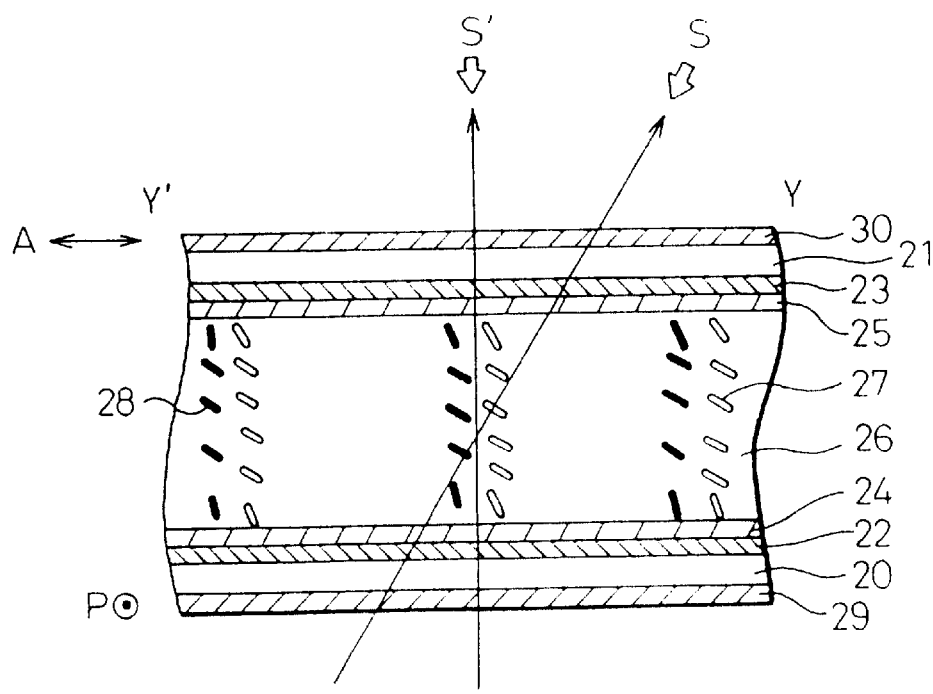
FIG. 6B is a cross sectional view along line Y-Y' shown in FIG. 5 in the presence of applied voltage, the view also explaining the first principle of the present invention.

FIGS. 6A and 6B show the cross sections along line Y-Y' indicated in FIG. 5, for explaining the first principle of the present invention. FIG. 6A shows the cross section of the panel in the absence of applied voltage (non-driving state) whilst FIG. 6B shows that of the panel in the presence of applied voltage (driving state).

In FIGS. 6A and 6B, 20 denotes a first glass substrate forming a substrate of the panel on the light incident side, 21 a second glass substrate forming another substrate on the light emitting side, the first and the second glass substrates forming the pair of substrates disposed parallel to each other. 22 denotes a first electrode formed on an inner surface of glass substrate 20, the inner surface facing the second glass substrate 21, and 23 a second electrode formed on an inner surface of second glass substrate 21, the inner surface facing the first glass substrate 20. The liquid crystal sandwiched by first and second glass substrates 20 and 21 are driven by applying a voltage to these electrodes 22 and 23 and forming an electric field therebetween. 24 denotes a first alignment film formed on plate 20 to cover first electrode 22, and 25 a second alignment film formed on plate 21 to cover second electrode 23. These two alignment films cause liquid crystal molecules to be aligned vertical to the glass substrates. 26 denotes a liquid crystal layer comprised of liquid crystal molecules 27 having a negative dielectric anisotropy. 29 denotes a first polarizing plate disposed outside first glass substrate 20, the polarizing plate whose direction P of the transmission axis is perpendicular to the paper surface, and 30 a second polarizing plate, disposed outside second glass substrate 21, whose direction A of the transmission axis is parallel to the paper surface. Thus, the transmission axis directions of these two polarizing plates intersect to each other at right angles.

The present invention is characterized in that a blue dichroic dye 28 is further added to liquid crystal layer 26. The molecules of dye 28 have an elongated shape similar to that of the liquid crystal molecules and have a strong absorption direction along the major axis of the molecules. When applying a voltage across electrodes 22 and 23, the molecules of dye 28 are aligned in parallel with the liquid crystal molecules, and absorb a yellow color component contained in the incident light. Dye 28 has a characteristic feature that the absorption coefficient of dye 28 in the yellow color band becomes larger as the polarization direction of an incident light approaches parallel to the major axis direction of the dye molecules.

In the VA mode liquid crystal panel according to the present invention shown in FIGS. 5, 6A and 6B, liquid crystal molecules 27 are aligned almost perpendicular to glass substrates 20 and 21 (as shown in FIG. 6A) in the absence of applied voltage across electrodes 22 and 23. In this case, incident light, which has passed the first polarizing plate 29 (the light coming from the lower side of plate 20 as shown in FIG. 6B), advances through liquid crystal layer 26 without changing its polarization direction. As a result, the light cannot pass the second polarizing plate 30 whose polarization direction is perpendicular to that of first polarizing plate 29, thus allowing an excellent black display. In this case, an excellent black display is also obtained when observing the panel from the upper oblique direction S.

When applying a voltage across the first and second electrodes 22 and 23 to realize a white display, as shown in FIG. 6A, liquid crystal molecules 27, which has been aligned almost perpendicular to the substrates in the absence of an applied voltage, change their alignment direction according to the applied voltage, thus forming an angle of 45 degrees with substrates 20 and 21. In this situation, the liquid crystal panel according to the present invention presents a desired white display when observing the panel from the panel front (the direction indicated by arrow S'). At the same time, the yellow coloring of the panel is suppressed and an excellent white display can also be obtained when observing the panel from the upper oblique direction S. This is because the molecules of dye 28 tend to be aligned parallel to liquid crystal molecules 27, and as a result, they make an angle of about 90 degrees with the incident light to strongly absorb a yellow color component in the incident light while it advances through the liquid crystal layer.

Figure 7:
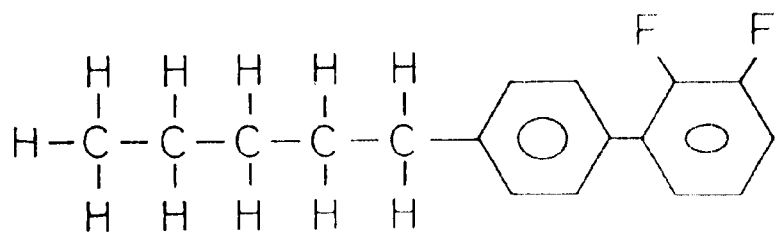
FIG. 7 shows an example of the structural formula of a liquid crystal used in the present invention.
Figure 8:
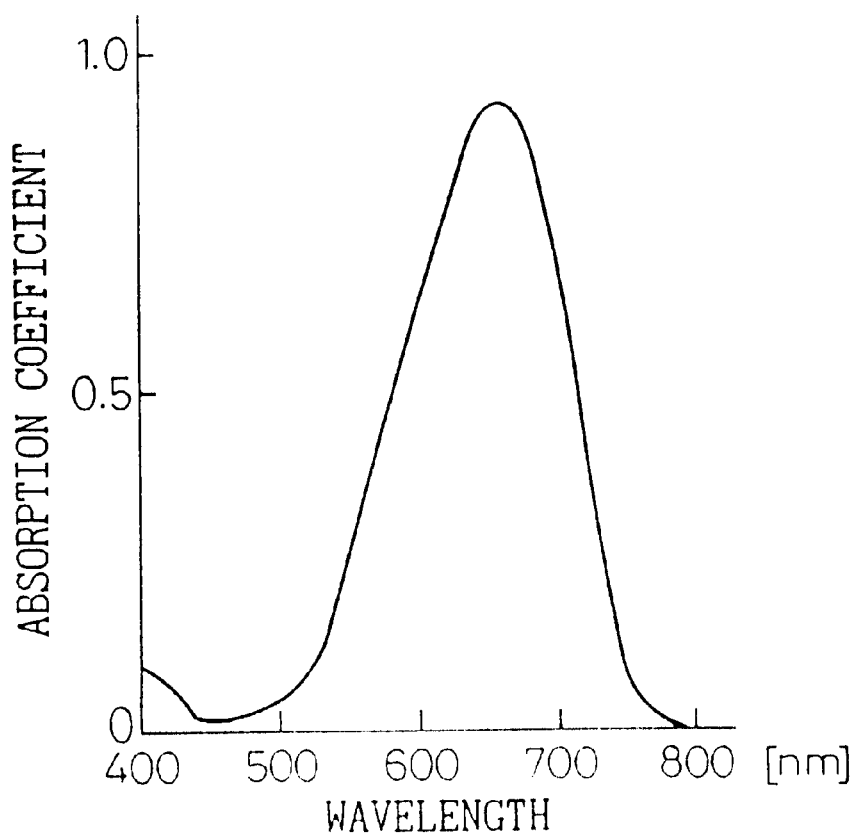
FIG. 8 is a graph showing the absorption characteristics of a dichroic dye.

An evaluation has been made for the structure shown in FIGS. 6 to test the effect of the present invention. Boron silicate glass having a thickness of 1.1 mm is used as a material of glass substrates 20 and 21 and vertical alignment film RN722 having a thickness of 800 Å made by Nissan Kagaku Ltd. is used as the material of alignment films 24 and 25. A biphenyl liquid crystal having the structural formula shown in FIG. 7 (ZLI-4318 made by Merk Japan Ltd.: $\Delta\epsilon$ (dielectric anisotropy)=−2.0, $\Delta n$ (refractive index anisotropy)=0.1243) is used as a material of the liquid crystal. A chiral agent (CN made by Chisso Ltd.) is added to 1 wt % into liquid crystal layer 26 and the thickness of the layer is set to 4 $\mu$m. An anthraquinone dye (SI-497 made by Mitsui-Toatsu Ltd.) is added to 1 wt % as a dichroic dye. FIG. 8 shows the absorption characteristics of this dichroic dye wherein the vertical axis indicates an absorption coefficient and the axis of abscissa indicates an absorption wavelength. As is understood from this figure, the dichroic dye used in this evaluation has an absorption peak around 650 nm so that it absorbs yellow light efficiently.

Figure 9:
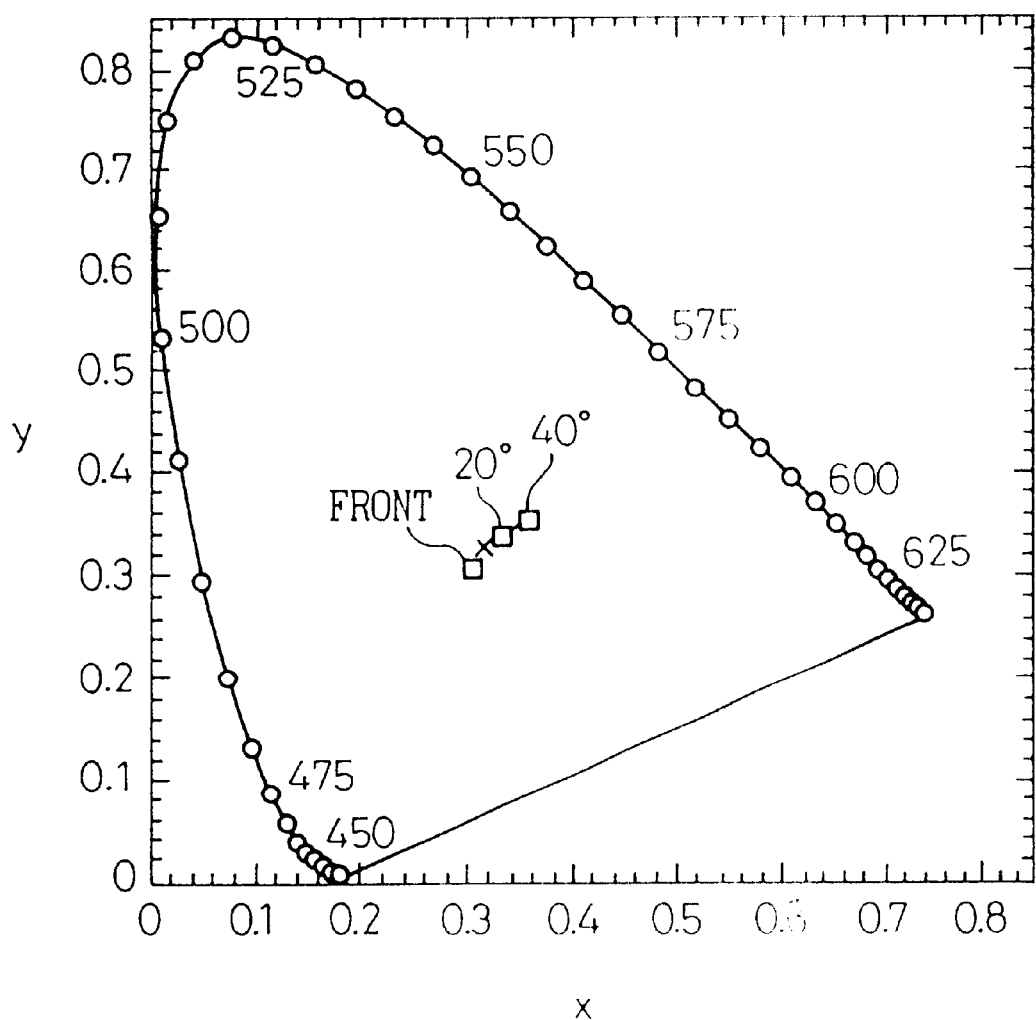
FIG. 9 is a graph showing the coloring characteristics of a VA mode liquid crystal panel according to the present invention.

FIG. 9 shows the coloring characteristics of the VA mode liquid crystal panel according to the present invention. In this graph, color changes are plotted on the standard CIE (1931) color system by varying the visual angle from 0 (the panel front) to 40 degrees (the upper oblique direction). Symbol X in this figure shows the standard white. To complete the evaluation, a monochromatic liquid crystal cell was used which has the above mentioned structure.

As is understood from this figure, the yellow coloring is reduced even if the visual angle declines to the upper oblique direction, i.e., an angle of 40 degrees. This phenomenon is made apparent when compared with the coloring characteristics of the conventional liquid crystal panel shown in FIG. 3, the evaluation of the characteristics being carried out in the same structure as that of the panel shown in FIGS. 5 and 6 except that no dye is added into the liquid crystal layer.

As mentioned above, it is possible to suppress the yellow coloring by adding a blue dichroic dye to the liquid crystal.

In particular, when an effective retardation $\Delta n \cdot d$ of the conventional VA mode liquid crystal panel shown in FIGS. 1 and 2 in the absence of an applied voltage exceeds 220 nm, yellow coloring may occur when observing the panel not only from an upper oblique direction but from the front direction of the panel. On the other hand, in the structure according to the present invention, it is confirmed from the above mentioned evaluation that no yellow coloring occurs when observing the panel from the front direction of the panel. When observing the panel from the upper oblique direction, no substantial yellow coloring, which affects practical use, occurs even if the effective retardation $\Delta n \cdot d$ from the front direction is selected to be 275 nm in the absence of applied voltage.

The effective retardation value from which the yellow coloring becomes remarkable even though a dye is added into the liquid crystal layer is larger than 350 nm which is a value obtained by applying no dichroic dye into the liquid crystal layer. It should be noted, however, that this value changes depending on materials of the dye and the added amount of the dye.

FIG. 10 is a view for explaining the second principle of the present invention. In fact, FIG. 10 is a cross sectional view along line Y-Y' shown in FIG. 5 in the presence of applied voltage (in a driving condition).

In FIG. 10, 31 denotes a first glass substrate forming a substrate on the light incident side and 32 a second glass substrate forming another substrate on the light emitting side, these two glass substrates forming a pair of substrates. 33 denotes a first electrode formed on an inner surface of glass substrate 31, the inner surface facing the second glass substrate 32, and 34 a second electrode formed on an inner surface of glass substrate 32, the inner surface facing the first glass substrate 31. An electric field is generated by applying a voltage across these electrodes. 35 denotes a first alignment film formed on glass substrate 31 to cover first electrode 33, and 36 a second alignment film formed on glass substrate 32 to cover second electrode 34. These films function to make the liquid crystal molecules aligned in a direction vertical to the substrates in the absence of an applied voltage (not shown). 37 denotes a liquid crystal layer comprised of a plurality of liquid crystal molecules 38 having a negative dielectric anisotropy. 38 denotes a first polarizing plate disposed outside first glass substrate 31 and having transmission axis P vertical to the paper surface, and 40 a second polarizing plate disposed outside glass substrate 32 and having transmission axis A parallel to the paper surface. Therefore, the transmission axes of these two polarizing plates intersect with each other at right angles.

41 denotes a color compensation layer containing a blue dichroic dye, this layer forming a characteristic feature of the present invention. In this structure shown in FIG. 10, a color compensation layer 41 is disposed between second glass substrate 32 and second polarizing plate 40. The yellow coloring, which appeared when the visual angle is in an upper oblique direction, is compensated for by the color compensating layer 41, thus providing an excellent display.

Figure 11A:
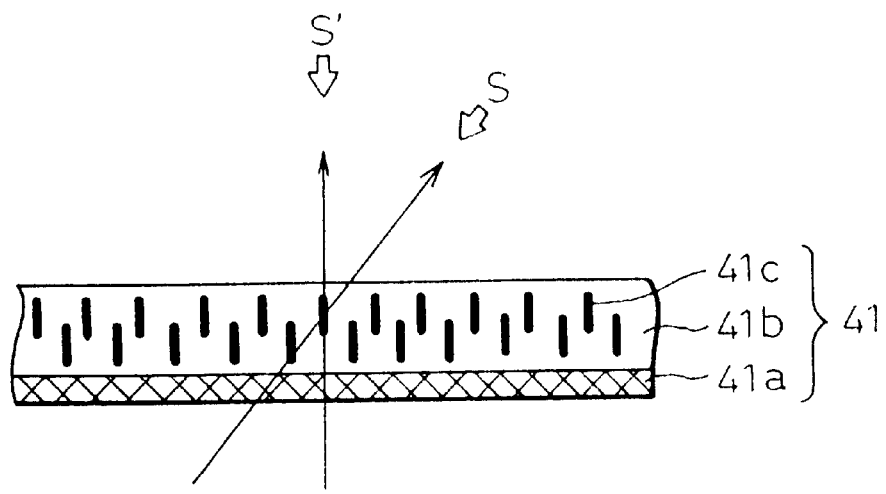
FIGS. 11A to 11C are view for explaining the structures of a color compensation layer shown in FIG. 10.
Figure 11B:
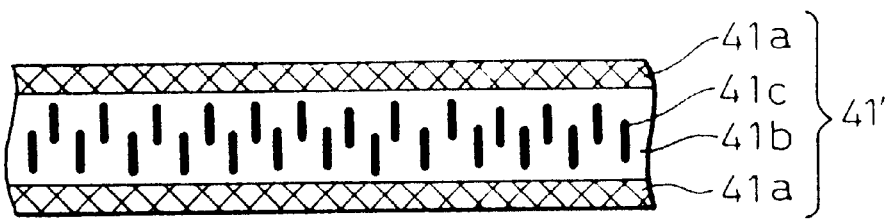
Figure 11C:
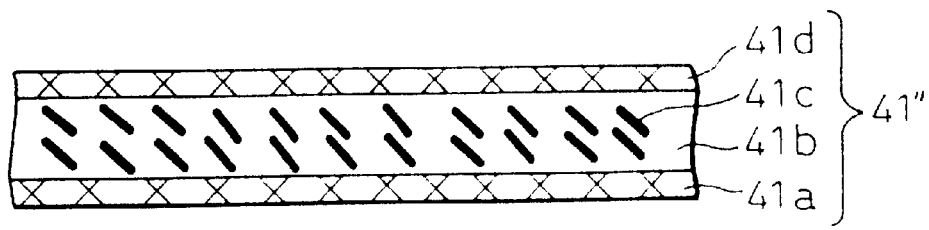

FIGS. 11A to 11C show various structures of the color compensation layer. The color compensation layer 41 shown in FIG. 11A is comprised of a support 41a made from a PET (polethylene terephthalate) film, liquid crystal polymer 41b hardened by ultra-violet radiation and a blue dichroic dye 41c aligned perpendicular to support 41a in liquid crystal polymer 41b. The color compensation layer 41' shown in FIG. 11B has a structure to sandwich the liquid crystal polymer 41b by a surface layer 41d made from a PET film and the support 41a. The blue dichroic dye 41c has the same characteristics as that of dye 28 shown in FIGS. 2. The color compensation layer 41" shown in FIG. 11C has the same structure as that of shown in FIG. 11B except that the molecules of the blue dichroic dye 41c are aligned obliquely to the support 41a.

In the VA mode liquid crystal panel of the present invention shown in FIGS. 10 and 11, liquid crystal molecules 38 are aligned almost perpendicular to the substrates in the absence of applied voltage across electrodes 33 and 34. On the other hand, when applying a voltage to cause a white display across electrodes 33 and 34, liquid crystal molecules change their alignment direction according to the applied voltage, thus forming an angle of 45 degrees to substrates 31 and 32. In this case, the liquid crystal panel of the present invention gives a desirable white display when observing the panel from the panel front (the direction shown by arrow S'). In addition, when observing the panel from the upper oblique direction (the direction indicated by arrow S), a yellow coloring is suppressed since incident light passing through the liquid crystal layer obliquely also passes through dyes 41c in color compensation layer 41 or 41' obliquely, and therefore, dye 41c absorbs the yellow component of the incident light.

On the other hand, in a case of the liquid crystal panel using color compensation layer 41" shown in FIG. 11C, the panel appears to be slightly colored blue when observed from the panel front (the direction indicated by arrow S'). However, when observing the panel from the upper oblique direction (the direction indicated by arrow S), the yellow coloring of the panel is suppressed better than the case of the panel using the color compensation layer 41 or 41'.

Figure 12:
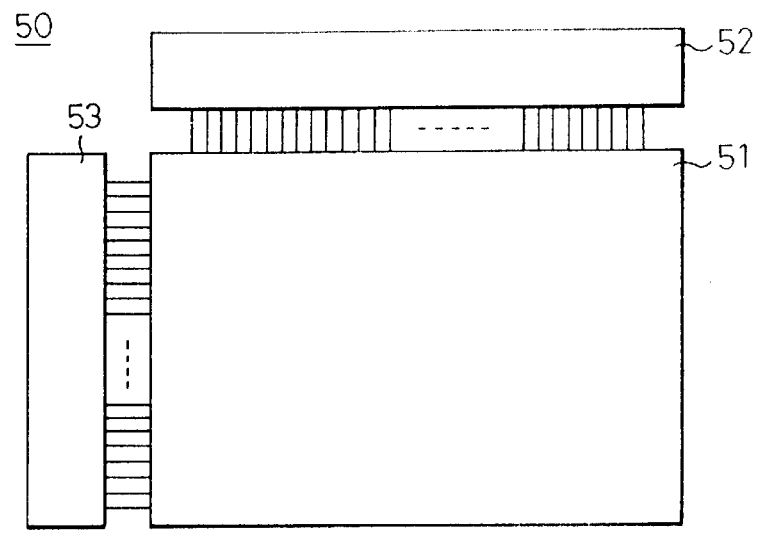
FIG. 12 is a schematic view showing the structure of a liquid crystal display of the present invention.

FIG. 12 shows a structure of a liquid crystal display of the present invention. In this figure, 50 denotes a liquid crystal display comprising a liquid crystal panel 51 according to the present invention and first and second driving circuits 52 and 53.

Since liquid crystal panel 51 is an active-matrix type liquid crystal panel, first driving circuit 52 provides display data to panel 51 and second driving circuit 53 provides scan data to panel 51.

Figure 13:
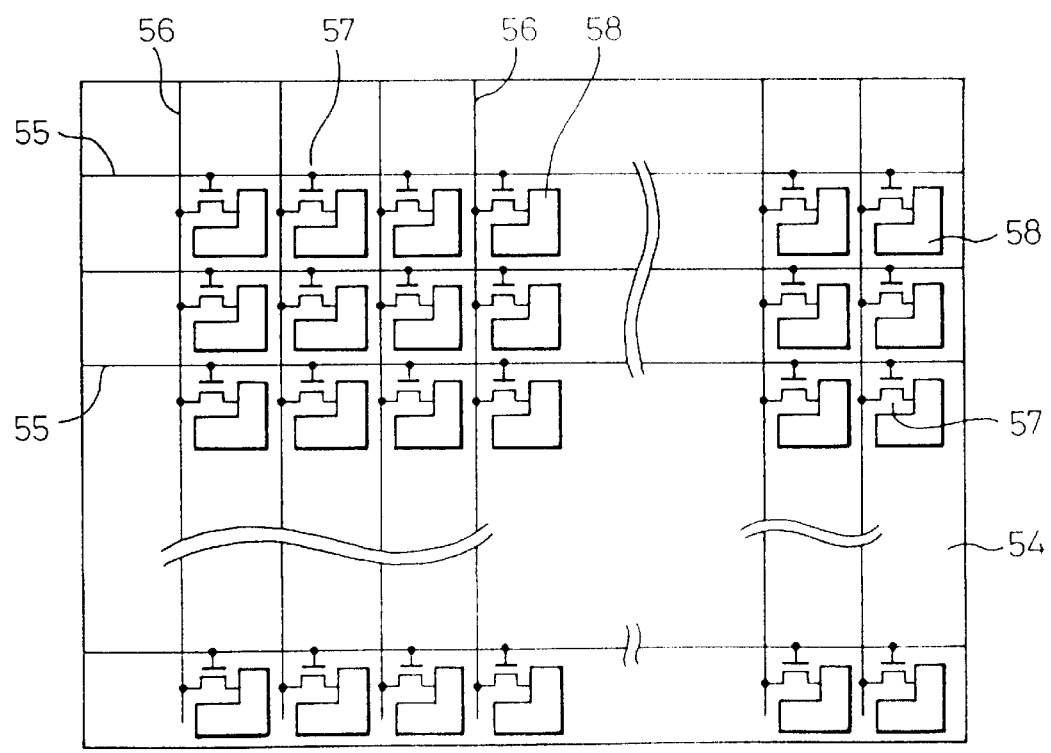
FIG. 13 is a view showing the detailed structure of a part of the liquid crystal panel shown in FIG. 12.

FIG. 13 is a view for explaining the detailed structure of liquid crystal panel 51 shown in FIG. 12. In this figure, a TFT substrate is shown which forms an active-matrix type liquid crystal panel using a plurality of thin film transistors (referred to as TFT, below) as switching elements.

In FIG. 13, 54 denotes a glass substrate, 55 a plurality of gate bus lines arranged parallel to each other, 56 a plurality of drain bus lines arranged parallel to each other, 57 a plurality of TFTs, and 58 a plurality of pixel electrodes. Each gate bus line and each drain bus line are electrically insulated and intersect with each other at right angles to form a matrix. On each intersecting portion of gate bus line 55 and drain bus line 56, a TFT 57 and a pixel electrode 58 are formed. The gate electrode of TFT 57 is connected with gate bus line 55 and the drain electrode is connected with drain bus line 56 respectively. On the other hand, the source electrode of TFT 57 is connected with pixel electrode 58.

Although not shown in FIG. 13, a common substrate is arranged oppositely to the TFT substrate and a liquid crystal layer is sealed between the two substrates. On the common substrate, a common electrode, a color filter and so on are formed.

Figure 14:
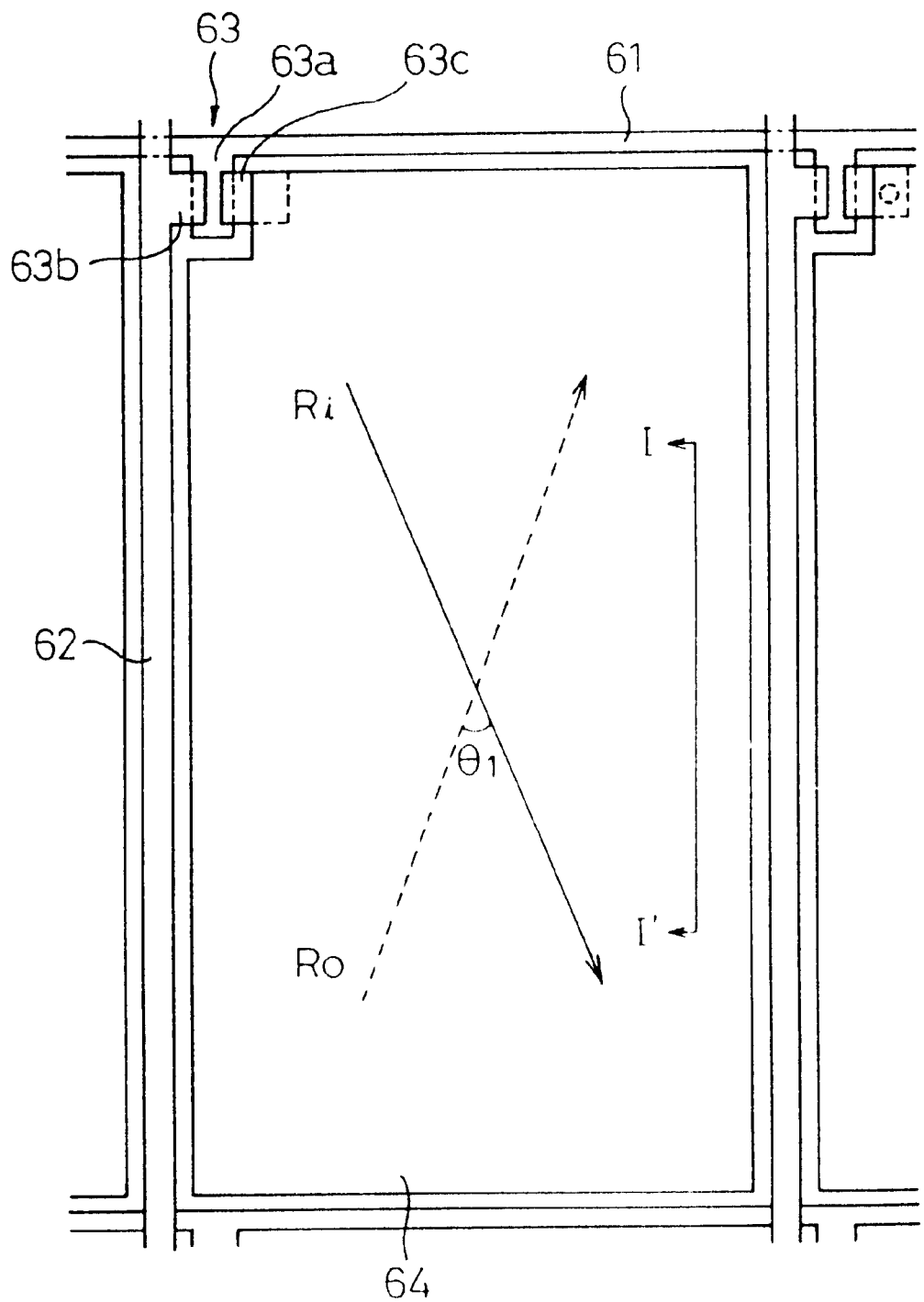
FIG. 14 is a view showing an example of the structure of the liquid crystal panel shown in FIG. 13.
Figure 15A:
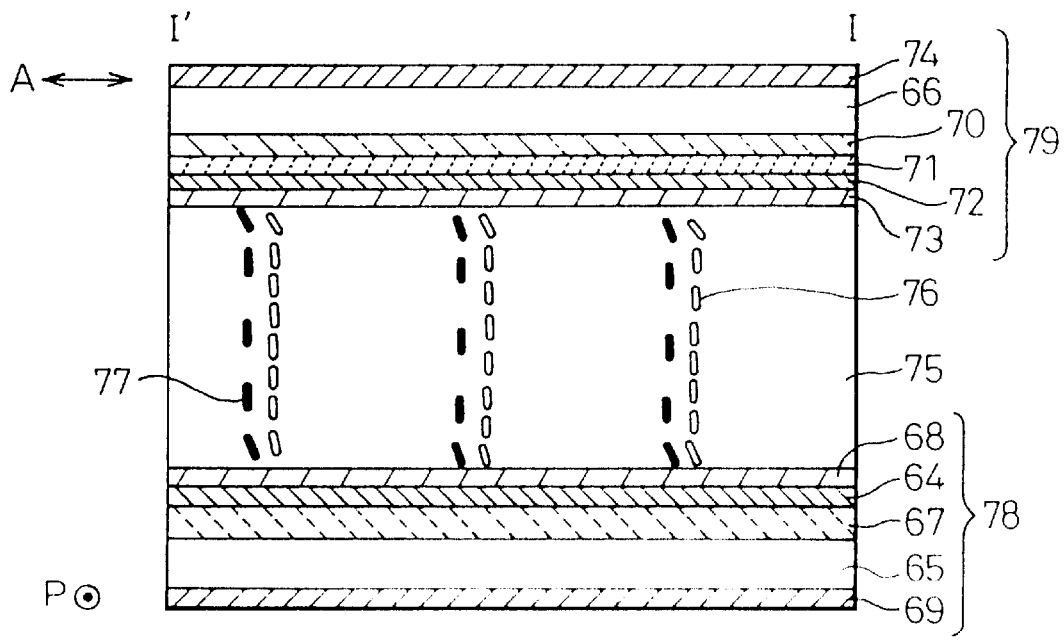
FIG. 15A is a cross sectional view along line I-I' shown in FIG. 14 in the absence of applied voltage.
Figure 15B:
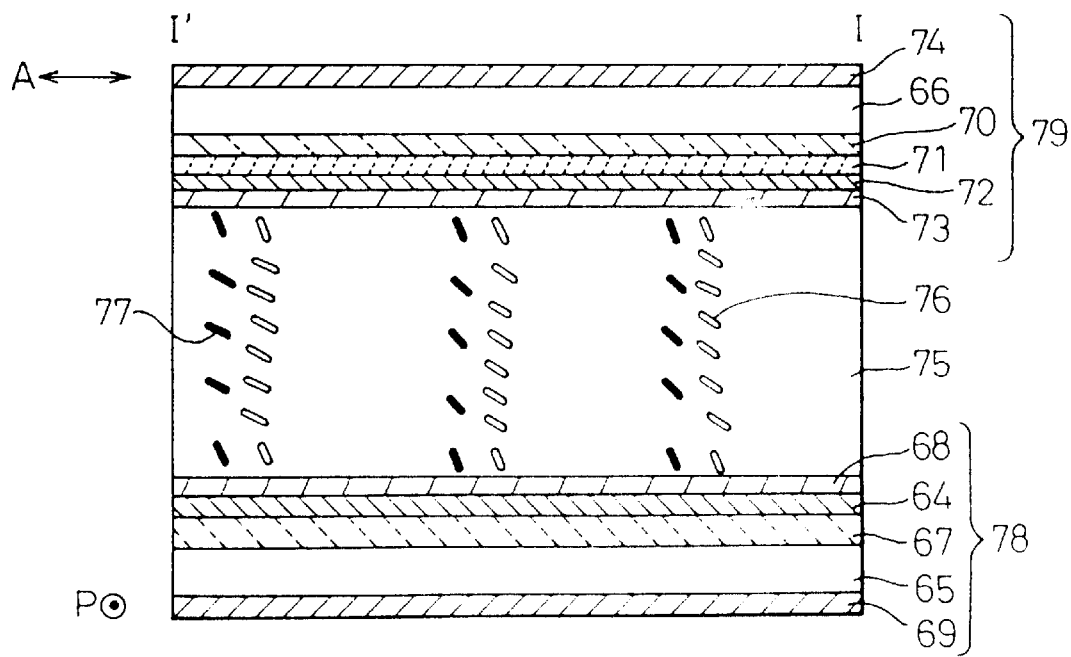
FIG. 15B is a cross sectional view along line I-I' shown in FIG. 14 in the presence of applied voltage.
Figure 16:
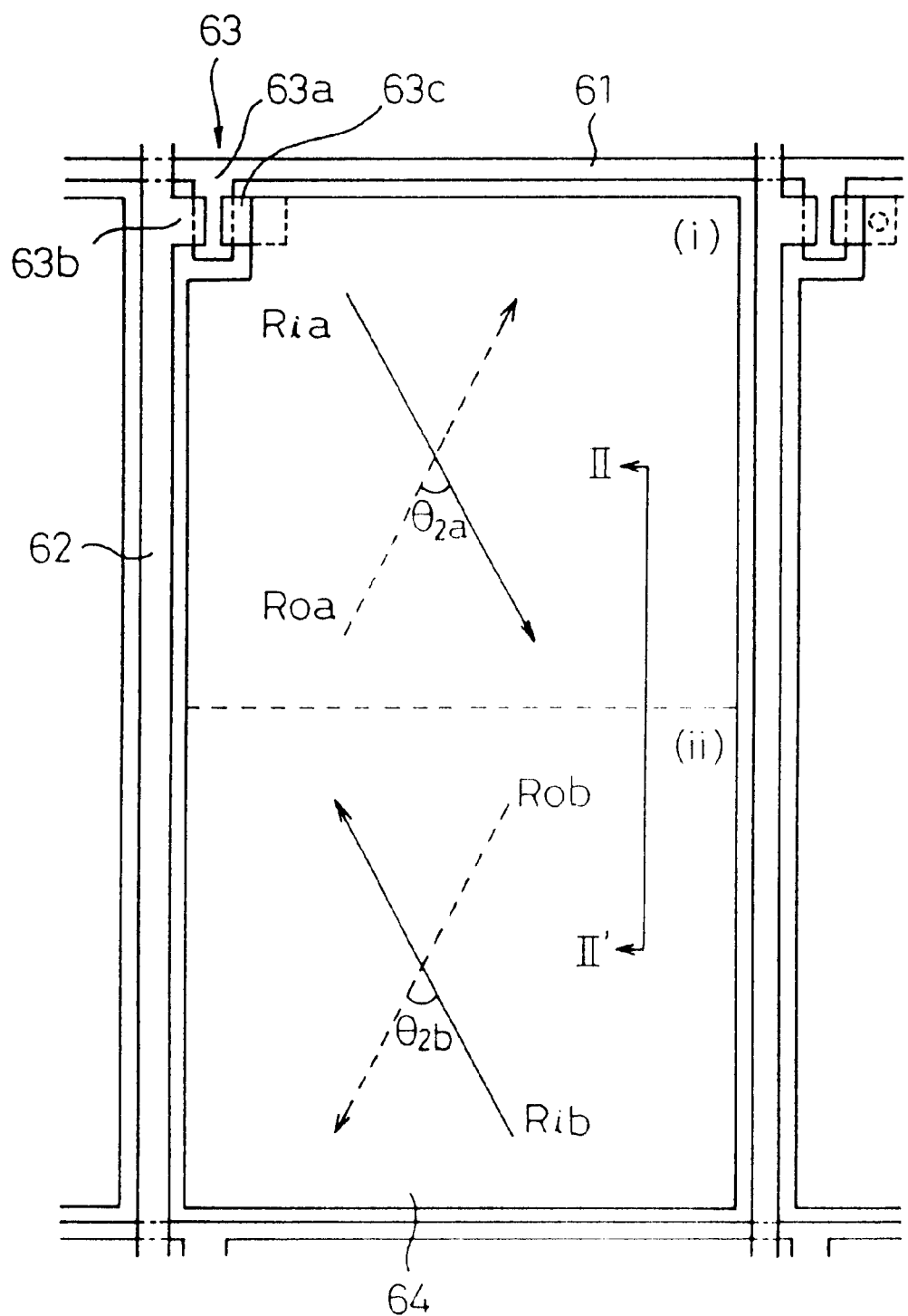
FIG. 16 is a view showing another example structure of the liquid crystal panel shown in FIG. 13.

FIGS. 14 to 17 show a various examples of one pixel of the liquid crystal panel according to the present invention, wherein FIGS. 14 and 15 show a first example and FIGS. 16 and 17 show a second example.

(First Example)

FIGS. 14 and 15 show a pixel portion of the liquid crystal panel according to the present invention, wherein FIG. 15 is a cross sectional view of the pixel taken along line I-I' shown in FIG. 14.

In FIG. 14, 61 denotes a gate bus line and 62 a drain bus line, wherein these lines are insulated by means of an insulating film from each other at their intersecting portion. 63 denotes a TFT formed at an intersection of gate bus line 61 and drain bus line 62. 64 denotes a pixel electrode. TFT 63 is comprised of a gate electrode 63a, drain electrode 63b, and a source electrode 63c. Gate electrode 63a is formed as a part of gate bus line 61 and drain electrode 63b is formed as a part of drain bus line 62. In addition, a source electrode 63c is electrically connected with a pixel electrode 64. These elements are formed on the TFT substrate as shown in FIGS. 15A and 15B. On the TFT substrate, an alignment film is formed as shown in FIGS. 15A and 15B to cover those elements. In FIG. 14, Ri indicates a rubbing direction of the alignment film formed on the TFT substrate, and on the other hand, Ro indicates another rubbing direction of another alignment film formed on the common substrate (shown in FIGS. 15A and 15B) facing the TFT substrate. The angle $\theta_1$ formed between the respective rubbing directions Ri and Ro is about 45 degrees.

FIG. 15A shows the cross section along the line I-I' shown in FIG. 14 in the absence of voltage (non-driving condition) and FIG. 15B shows that of in the presence of voltage (driving condition).

In FIGS. 15A and 15B, 78 denotes the TFT substrate and 79 the common substrate mentioned above.

TFT substrate 78 is comprised of a first glass substrate 65, an insulating film 67 formed on a surface of first glass substrate 65 which surface faces a common substrate 79, a pixel electrode 64 formed on insulating film 67, a first vertical alignment film 68 formed to cover pixel electrode 64, and a polarizing plate 69 disposed outside first glass substrate 65 and having a transmission axis whose direction is perpendicular to the paper surface.

Common substrate 79 is comprised of a second glass substrate 66, a color filter layer 70 formed on a surface of second glass substrate 66 which surface faces to TFT substrate 78, a protection film 71 for covering and protecting color filter 70, a common electrode 72 formed on protection film 71, a second vertical alignment film 73 formed to cover common electrode 72, and a polarizing plate 74 disposed outside second glass substrate 66 and having a transmission axis A parallel to the paper surface.

75 denotes a liquid crystal layer sandwiched by TFT substrate 78 and a common substrate 79. Liquid crystal layer 75 is comprises of liquid crystal molecules 76 having a negative dielectric anisotropy containing a blue dichroic dye 77. Among liquid crystal molecules 76, ones adjacent to TFT substrate 78 and common substrate 79 have a pre-tilt angle of 89 degrees.

Taking the panel characteristics, regarding the visual angle and the contrast, into consideration, it is preferable that the pre-tilt angle is set to more than or equal to 75 degrees and less than 90 degrees, and more preferable, more than or equal to 87 degrees.

As shown in FIG. 15A, both the liquid crystal molecules 76 and the dye molecule 77 align almost perpendicular to substrates 78 and 79 in the absence of an applied voltage. Since the polarization axes of two polarizing plates 69 and 74 are disposed to intersect each other at right angles, an excellent black display can be obtained in this case.

On the other hand, as shown in FIG. 15B, liquid crystal molecules 76 change the alignment direction towards a direction parallel to substrates 78 and 79 in the presence of applied voltage. At the same time, dye 77 changes the alignment direction towards a direction parallel to substrates 78 and 79 since molecules of dye 77 tend to align parallel to liquid crystal molecules 76.

Accordingly, when observing the panel from an upper oblique direction, an excellent color display can be obtained because dye 77 absorbs the yellow component of an incident light, and thus suppresses the yellow coloring of the panel.

(Second Example)

Figure 17A:
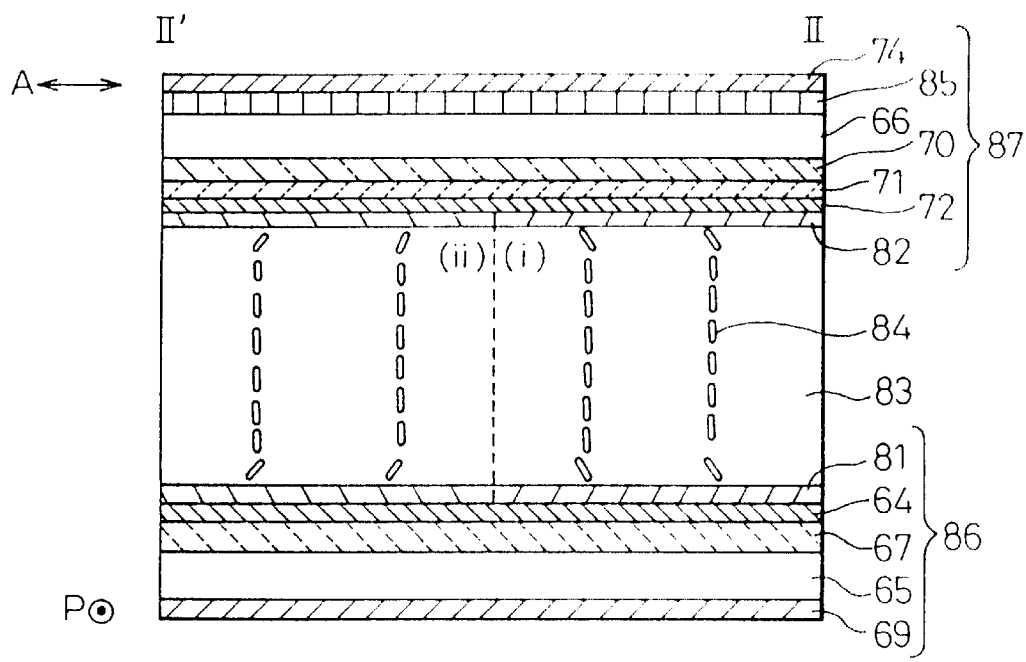
FIG. 17A is a cross sectional view along line II-II' shown in FIG. 16 in the absence of applied voltage.
Figure 17B:
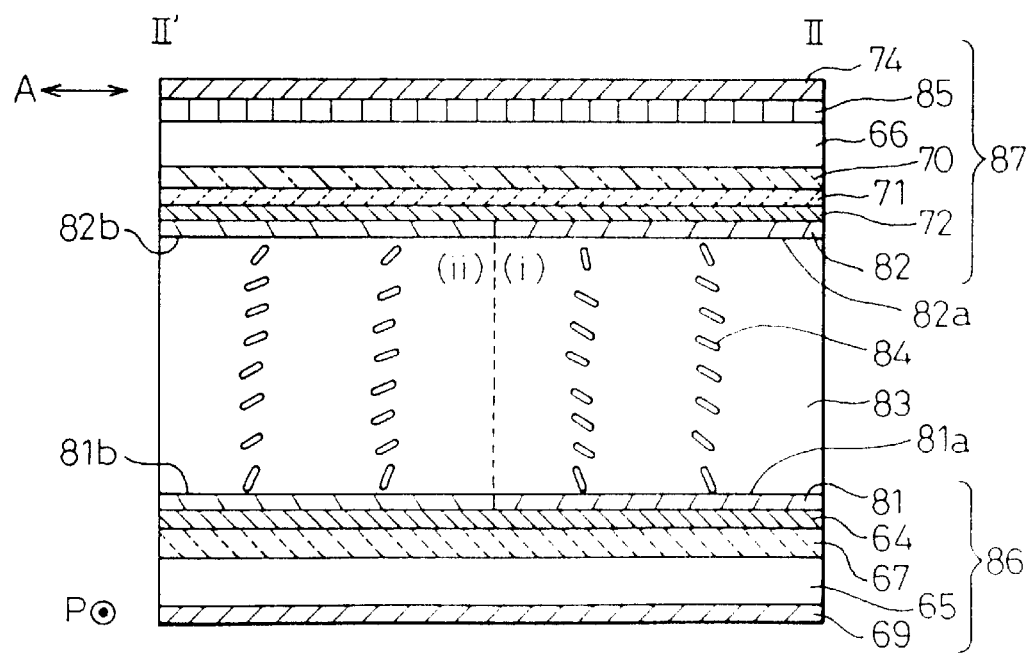
FIG. 17B is a cross sectional view along line II-II' shown in FIG. 16 in the presence of applied voltage.

FIGS. 16 and 17 show the second example of a pixel portion of the liquid crystal panel, which is of an active matrix type, according to the present invention. FIG. 17A is a cross sectional view along line II-II' shown in FIG. 16 in the absence of applied voltage and FIG. 17B is the same as that of shown in FIG. 17A in the presence of applied voltage. In FIG. 16, the same numerals as those shown in FIG. 14 denote the same or similar structure elements. However, the pixel shown in FIG. 16 differs from that shown in FIG. 14 in the rubbing structures of the alignment films provided on the TFT substrate and the common substrate.

As shown in FIGS. 16A and 16B, one pixel is divided into two regions (i) and (ii) whose alignment directions differ from each other. This structure is called an alignment division. Although various methods are known to accomplish the alignment division, the present example forms the two regions by changing the rubbing directions of these regions.

In actuality, on an alignment film formed on the TFT substrate, the pixel region is divided into a first region (i) and a second region (ii), each region being rubbed in direction Ria or Rib opposite to each other. On another alignment film formed on the common substrate, the pixel region is divided into a first (i) and a second region (ii) corresponding to the first and second regions formed on the alignment film of the TFT substrate. In addition, the first and the second regions on the common substrates are rubbed in directions Roa or Rob opposite to each other. In this example, angle $\theta_{2a}$ between rubbing directions Ria and Roa in first region (i) and angle $\theta_{2b}$ between rubbing directions Rib and Rob in second region (ii) are 45 degrees respectively.

According to the above rubbing structure, it is possible to differentiate the alignment directions of liquid crystal molecules in the two regions. This results in the formation of two regions having different (in this example, opposite) visual angle characteristics to each other on one pixel. This fact makes it possible to average the visual angle characteristics over the entire panel, and as a result, to improve the visual angle characteristics of the panel.

FIG. 17A shows a cross section along line II-II' of the liquid crystal panel shown in FIG. 16 in the absence of an applied voltage (non-driving state) in FIG. 17B shows that of in the presence of an applied voltage (driving state).

In FIGS. 17, the same reference numerals as those of shown in FIGS. 15 denote the same or similar structural elements. However, the structure shown in FIGS. 17 differs from that shown in FIGS. 15 in that TFT substrate 86 has two regions 81a and 81b in alignment film 81, each region having a different rubbing direction corresponding to first region (i) or second region (ii). In addition to this, common substrate 87 has two regions 82a and 82b in alignment film 82, each region having a different rubbing direction to each other corresponding to first region (i) or second region (ii), a color compensation layer 85 is disposed between glass substrate 66 and polarizing plate 74, and liquid crystal layer 83 only consists of liquid crystal molecules 84.

The color compensation layers shown in FIGS. 11 can be used as color compensation layer 85 shown in FIGS. 17. Basically, the layer is formed as a structural element in which blue dichroic dye is arranged vertically or obliquely in a predetermined angle.

In actuality, any one of color compensation layers 41, 41' or 41" shown in FIGS. 11A, 11B and 11C can be used to be color compensation layer 85 shown in FIGS. 17. As explained in FIGS. 11, 41a indicates the PET film, 41b the liquid crystal polymer hardened by irradiation of an ultraviolet light, and 41c the blue dichroic dye.

To form color compensation layer 41 shown in FIG. 11A, first, a prepolymer 41 of a high molecular liquid crystal, which contains a blue dichroic dye 41c, is applied on PET film 41a which is to be a supporting member. In this case, the surface of PET film 41a is pre-treated so that the liquid crystal molecules are aligned perpendicular to the surface. Such a pretreatment includes applying on PET film 41a a film having a property to align liquid crystal molecules perpendicular to the film surface. Such a film includes a vertical alignment film widely used for forming a liquid crystal panel, a film of a silane coupling agent, and a film of a monobasic carboxylic acid chromium complex.

Since PET film 41a has undergone such a pretreatment, each liquid crystal molecule of high molecular liquid crystal 41b is aligned almost perpendicular to film 41a. Accordingly, the molecules of blue dichroic dye 41c are also aligned almost perpendicular to PET film 41a. In this situation, then, an ultra-violet light is applied to polymerize and harden a high molecule liquid crystal 41b. As a result, color compensation layer 85 (41) is formed to include blue dichroic dye 41c which are aligned almost perpendicular to the layer. Color compensation layer 41' shown in FIG. 11B has a structure in which a PET film 41d is formed to cover the structure shown in FIG. 11A. Layer 41' can be formed by the following steps. First, prepolymer 41b of a high molecule liquid crystal added with blue dichroic dye 41c is applied on PET film 41a, and second, PET film 41d is laminated to sandwich prepolymer 41b with PET film 41a. Finally, an ultra-violet light is applied to this structure so sa to harden prepolymer 41b.

Color compensation layer 41" shown in FIG. 11C is formed in the same manner as that mentioned above except that, when forming prepolymer 41b of a high molecule liquid crystal, the molecules of the liquid crystal and those of blue dichroic dye 41c are made to align obliquely to form a predetermined angle to the PET film 41a. An ultra-violet hardening is carried out in this situation.

Any one of structures shown in FIGS. 11A, 11B and 11C can be adopted to as color compensation layer 85.

Since liquid crystal molecules 84 are aligned almost perpendicular to substrates 86 and 87 in the absence of applied voltage as shown in FIG. 17A, and the polarization axes of two polarizing plates 69 and 74 are disposed to intersect to each other at right angles, an excellent black display can be accomplished.

In the presence of applied voltage, liquid crystal molecules change their alignment direction towards a direction parallel to substrates 86 and 87 as shown in FIG. 17B. In this case, however, the declining directions of liquid crystal molecules 84 differ between regions (i) and (ii) due to the difference in rubbing directions of these regions.

When observing the panel shown in FIG. 16 from an upper oblique direction, a yellow coloring may appear due to the influence of liquid crystal molecules 84 in region (i) if no color compensation layer 85 is provided. The yellow coloring may appear due to the influence of liquid crystal molecules 84 in region (ii) when observing the panel from a lower oblique direction and if no color compensation layer 85 is provided. In this embodiment, however, the blue dichroic dye in color compensation layer 85 absorbs the yellow color component in a light passing through both regions (i) and (ii), and therefore, the yellow coloring can be suppressed when observing the panel from an upper or lower oblique direction, thus allowing an excellent color display.

The amount of the blue dichroic dye added to the liquid crystal layer is preferably in the range from 0.5 wt % to 5 wt %. Under 0.5 wt %, almost no effect is obtainable from the addition of the dye. On the other hand, the dye may deposit out when the amount of the dye exceeds 5 wt %. Since the dye may be considered to be an impurity in the liquid crystal, it is not suitable to add too much of such a dye. Considering both advantages and disadvantages arising from the addition of dye, the proper amount of dye is found to be from 1 wt % to 3 wt %.

In the above embodiment, the color compensation layer is disposed between the glass substrate on the light emitting side and the polarizing plate. However, the present invention is not restricted to this embodiment, and therefore, it is possible to place the color compensation layer outside the polarizing plate or on the light entering side. In addition, a structural element used in a conventional liquid crystal panel can be formed to function as the color compensation layer without forming the layer as a new structural element. The gist of the present embodiment, therefore, is not to add a dye into a liquid crystal layer, but to provide a color compensation layer containing a dye other than the liquid crystal layer.

In summary, the present invention has two fundamental structures, the first structure adding a blue dichroic dye into a liquid crystal layer while the second structure provides a color compensation layer containing a blue dichroic dye other than a liquid crystal layer.

The first structure does not increase the manufacturing steps of the panel because a dye can be added to a liquid crystal material prior to the formation of the panel, thus making it possible to produce a liquid crystal panel more easily. On the other hand, this structure is disadvantageous in that the reliability of the liquid crystal panel decreases depending on the amount of dye added to the liquid crystal layer because the dye can be considered to be an impurity in the liquid crystal layer.

Contrary to this, the second structure maintains a high reliability since nothing is added to the liquid crystal layer, but it increases the number of manufacturing steps to form a color compensation layer as a new and separate structural element.

As explained above, both of the two fundamental structures have advantages and disadvantages, and therefore, a suitable structure will be selected depending on a liquid crystal material and/or a dye material.

In summary, according to the present invention, a liquid crystal panel and a liquid crystal display using the panel can be obtained to have a high contrast and no coloring in the presence of applied voltage even when observing the panel from an upper or lower oblique direction.

Although the present invention has been described using preferred embodiments as mentioned above, it is obvious that the present invention should not be restricted to the described embodiments but can be changed or modified variously within the scope of the claims.

What is claimed is:

1. A liquid crystal panel, comprising:
 a pair of substrates disposed in a generally parallel relationship to each other;
 first and second electrodes formed on respective inner surfaces of said pair of substrates, said inner surfaces facing each other;
 first and second alignment films formed on respective inner surfaces of said pair of substrates to cover said first and second electrodes respectively;
 a pair of polarizing plates disposed adjacent to respective outer surfaces of said pair of substrates; and
 a liquid crystal layer which is sandwiched by said pair of substrates while contacting said first and second alignment films, said liquid crystal layer including liquid crystal molecules having a negative dielectric anisotropy, said liquid crystal layer having applied thereto a switching voltage generated across said first and second electrodes, said liquid crystal layer further containing a dichroic dye for compensating coloring of the panel as observed from an oblique direction;
 wherein said first and second alignment films align said liquid crystal molecules in said liquid crystal layer in a generally perpendicular relationship with said pair of substrates in the absence of voltage applied across said first and second electrodes.

2. The liquid crystal panel according to claim 1, wherein major axes of said liquid crystal molecules make a pre-tilt angle of greater than or equal to approximately 75 degrees and less than approximately 90 degrees with respect to at least one of said pair of substrates.

3. The liquid crystal panel according to claim 2, wherein said pre-tilt angle is greater than or equal to approximately 87 degrees.

4. The liquid crystal panel according to claim 1, wherein said dichroic dye has its largest absorption coefficient along a direction parallel to a major axis of the molecule thereof.

5. The liquid crystal panel according to claim 1, wherein said dichroic dye is comprises of an anthraquinone dye.

6. The liquid crystal panel according to claim 1, wherein said dichroic dye is comprised of a blue dichroic dye and an amount of addition of said dichroic dye is 0.5 to 5 wt % of said liquid crystal layer.

7. The liquid crystal panel according to claim 6, wherein said amount of addition of said dichroic dye is 1 to 3 wt % of said liquid crystal layer.

8. A liquid crystal display, comprising:

a liquid crystal panel, said liquid crystal panel including a pair of substrates disposed in a generally parallel relationship to each other, first and second electrodes formed on respective inner surfaces of said pair of substrates, said inner surfaces facing each other, first and second alignment films formed on the respective inner surfaces of said pair of substrates to cover said first and second electrodes respectively, and a liquid crystal layer which is sandwiched by said pair of substrates while contacting said first and second alignment films, said liquid crystal layer including liquid crystal molecules having a negative dielectric anisotropy, said liquid crystal layer having applied thereto a switching voltage generated across said first and second electrodes, said liquid crystal layer further containing a dichroic dye for compensating coloring of the panel as observed from an oblique direction, a pair of polarizing plates disposed adjacent to respective outer surfaces of said pair of substrates, wherein said first and second alignment films align said liquid crystal molecules in said liquid crystal layer in a generally perpendicular relationship with said pair of substrates in the absence of voltage applied across said first and second electrodes; and a driving circuit for applying a drive voltage to said first and second electrodes.

* * * * *